United States Patent [19]

Kobayashi et al.

[11] Patent Number: 5,187,999
[45] Date of Patent: Feb. 23, 1993

[54] MANUALLY OPERABLE PARK LOCK RELEASING MECHANISM FOR AUTOMATIC TRANSMISSION SHIFT CONTROL DEVICE

[75] Inventors: Satoshi Kobayashi, Hiratsuka; Yasushi Asano, Shizuoka; Hiroshi Yamazaki; Takumi Watanabe, both of Yokohama, all of Japan

[73] Assignees: Nissan Motor Co., Ltd; Fuji Kiko Co., Ltd.; Ohi Seisakusho Co., Ltd., all of Japan

[21] Appl. No.: 906,721

[22] Filed: Jun. 30, 1992

Related U.S. Application Data

[63] Continuation-in-part of Ser. No. 571,486, Aug. 22, 1990, abandoned.

[30] Foreign Application Priority Data

Aug. 31, 1989 [JP] Japan .................... 1-226916

[51] Int. Cl.⁵ .................... G05G 5/06; G05G 11/00
[52] U.S. Cl. .................... 74/528; 74/527; 74/538; 74/543; 74/536; 74/483 R; 74/557; 74/523; 192/4 A; 192/4 R
[58] Field of Search .................... 74/503, 538, 548, 536, 74/529, 540, 543, 560, 527; 192/4 A, 4 R, 4 C

[56] References Cited

U.S. PATENT DOCUMENTS

| | | | |
|---|---|---|---|
| 4,515,033 | 5/1985 | Carlo | 74/538 X |
| 4,884,668 | 12/1989 | Kobayashi et al. | 192/4 A |
| 4,909,096 | 3/1990 | Kobayashi | 74/538 |
| 4,919,242 | 4/1990 | Muramatsu et al. | 74/523 X |
| 4,934,496 | 6/1990 | Barske et al. | 192/4 A |
| 4,947,967 | 8/1990 | Kito et al. | 192/4 A |

FOREIGN PATENT DOCUMENTS

| | | | |
|---|---|---|---|
| 0315173 | 5/1989 | European Pat. Off. | |
| 3813653 | 5/1989 | Fed. Rep. of Germany | |
| 60-185750 | 12/1985 | Japan | 74/543 |
| 1486114 | 9/1977 | United Kingdom | 74/538 |

OTHER PUBLICATIONS

"Service Report No. 622 (R32-1) C-37", published by Nissan Motor Co., Ltd.

*Primary Examiner*—Vinh T. Luong
*Attorney, Agent, or Firm*—Lowe, Price, LeBlanc & Becker

[57] ABSTRACT

A park lock releasing mechanism for a transmission shift control device, includes a release button installed on a gear position indicator and top panel assembly, and a release lever installed on a selector lever and operatively connected through an intermediate member to the release button for driving a bushing of a park lock mechanism when the release button is pushed downward. The intermediate member is so shaped as to enable release button to be offset from the release lever in a vehicle width direction.

12 Claims, 8 Drawing Sheets

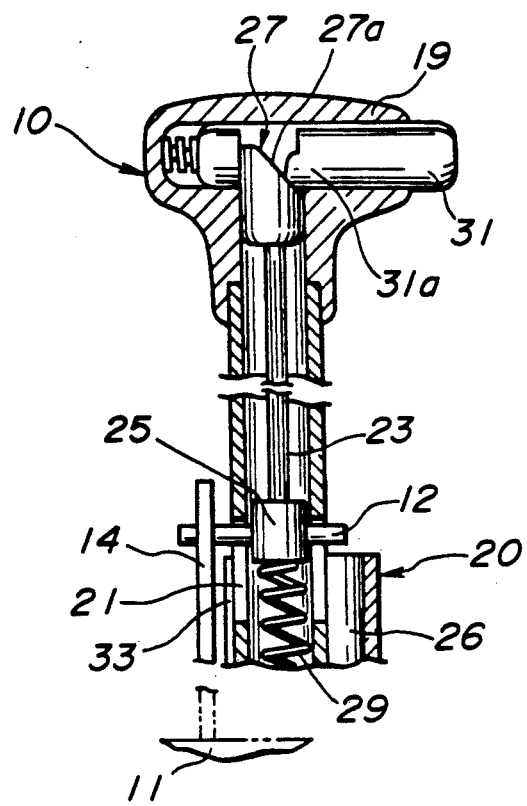
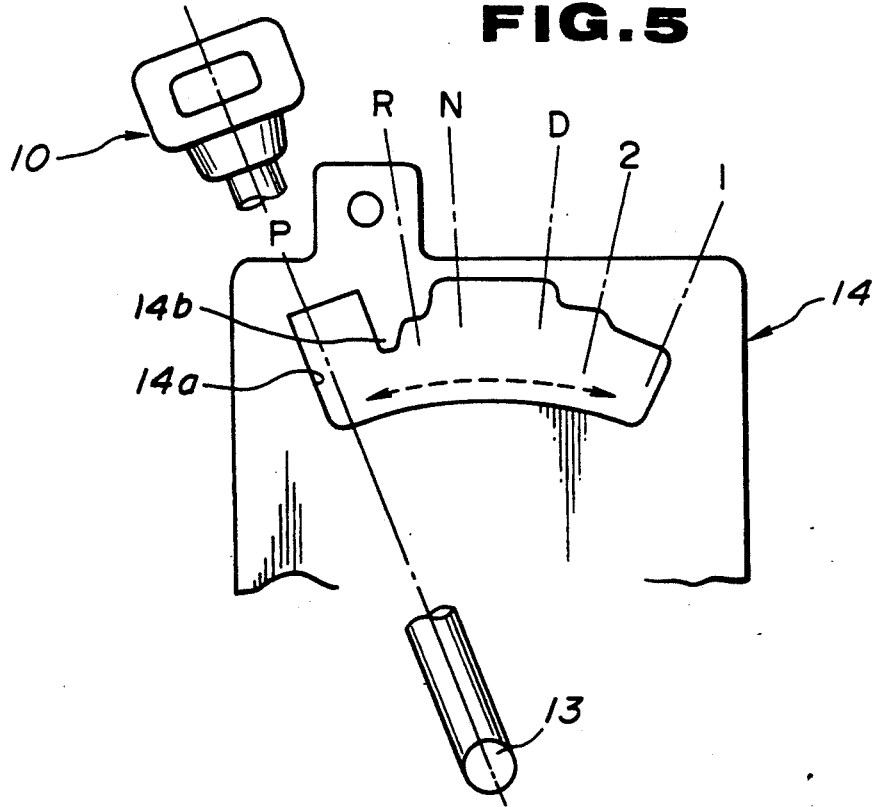

MANUALLY OPERABLE PARK LOCK RELEASING MECHANISM FOR AUTOMATIC TRANSMISSION SHIFT CONTROL DEVICE

This is a continuation-in-part of U.S. patent application Ser. No. 07/571,486, filed Aug. 22, 1990 now abandoned.

BACKGROUND OF THE INVENTION

1. Field of the Invention

The present invention relates in general to an automatic transmission shift control device with a park lock, and more particularly to a manually operable park lock releasing mechanism for such a shift control device.

2. Description of the Prior Art

An example of a prior art park lock releasing mechanism for an automatic transmission shift control device is disclosed in "Service Report No. 622 (R32-1) C-37. published by Nissan Motor Co., Ltd. and also shown in FIG. 7 hereof.

Referring to FIG. 12, a selector lever 10 is pivotally installed on a vehicle body (not shown). A position pin 12 is installed on the selector lever 10 for up-and-down movement relative thereto and engageable with detents of a position plate 14 for holding the selector lever 10 in gear positions such as a "P (parking)" position, "R (reverse)" position, "N (neutral)" position, "D (drive)" position, "2 (second)" position, and "1 (first)" position, respectively. A gear position indicator and top panel assembly 16 is disposed for concealment of the position pin 12, the position plate 14, etc. and for indication of a selected gear position. The gear position indicator and top panel assembly 16 is formed with a slot 18 such that the selector lever 10 is movable in the slot 18 in the forward and rearward directions of the vehicle body. A bushing 20 is rotatably installed on the selector lever 10 to prevent disengagement of the position pin 12 from the "P" position defining detent of the position plate 14, i.e., to prevent shifting of the selector lever 10 out of the "P" position, once the selector lever 10 is shifted to the "P" position and unless the foot brake is applied. A release button 22 is installed on the selector lever 10 on the rear side thereof and urged upward by a spring (not shown). A release lever 24 is disposed inside of the gear position indicator and top panel assembly 16 and pivotally installed on the selector lever 10 by means of a pivot 24a such that pushing of the release button 22 can cause the bushing 20 to rotate into a position where an opening 26 of the bushing 20 is aligned with the position pin 12 for making the position pin 12 disengageable from the "P" position defining detent of the position plate 14. A cover member 28 is provided for closing the slot 18 and formed with a notch 30 for allowing movement of the release button 22 therethrough.

A similar park lock mechanism utilizing a position pin, bushing, etc. is disclosed in U.S. Pat. No. 4,909,096, issued on Mar. 20, 1990, in the name of Satoshi Kobayashi and assigned to one of the assignees of this application.

A disadvantage of the above described prior art mechanism is that since the release button 22 is installed on the selector lever 10 to move together therewith the slot 18 of the gear position indicator and top panel assembly 16 is required to have an additional length corresponding to the size of the release button 22, causing some design restrictions.

Another disadvantage is that small trashes or the like substances and liquid such as juice may possibly intrude into the inside of the gear position indicator and top panel assembly 16 through the notch 30.

SUMMARY OF THE INVENTION

In accordance with the present invention, there is provide an automatic transmission shift control device for a vehicle, which comprises a selector lever movable into a plurality of gear positions including a parking position, a gear position indicator and top panel assembly for indicating a selected one of the gear positions and for concealing the inside of the automatic transmission shift control device from view, the gear position indicator and top panel assembly being formed with a slot for allowing movement of the selector lever therein, and park lock means disposed inside of the gear position indicator and top panel assembly for preventing shifting of the selector lever out of the parking position unless a foot brake of the vehicle is applied. The park lock means has a position plate formed with a plurality of detents defining the gear positions, a position pin movably installed on the selector lever and engageable with the detents for positioning the selector lever at one of the gear positions, and a bushing installed on the selector lever and rotatable between a first position where it permits disengagement of the position pin from a parking position defining detent and a second position where it prevents disengagement of the position pin from the parking position defining detent.

The above structure may follow the conventional fashion.

In accordance with the present invention, the automatic transmission shift control device further comprises manually operable park lock releasing means generally disposed inside of the gear position indicator and top panel assembly for enabling the selector lever to be shifted out of the parking position without applying the foot brake of the vehicle.

The park lock releasing means includes a release button installed on the gear position indicator and top panel assembly for up-and-down movement, an intermediate member, and a release lever pivotally installed on the selector lever adjacent to the bushing and operatively connected through the intermediate member to the release button for driving the bushing into the first position when the release button is pushed downward. The intermediate member is so shaped as to enable the release button to be offset from the release lever in a vehicle width direction.

This structure is effective for overcoming the above noted disadvantages and shortcomings inherent in the prior art device.

It is accordingly an object of the present invention to provide a novel park lock releasing mechanism for an automatic transmission shift control device which can increase the freedom of design.

It is another object of the present invention to provide a novel park lock releasing mechanism of the above described character which can dispose a release button at a desired position offset from a release lever.

It is a further object of the present invention to provide a novel park lock releasing mechanism of the above described character which makes it possible to efficiently utilize the space under a gear position indicator and top panel assembly and thereby attain a compact transmission shift control device.

It is a further object of the present invention to provide a novel park lock releasing mechanism of the above described character which can assuredly prevent access of small substances and liquid to a park lock mechanism.

BRIEF DESCRIPTION OF THE DRAWINGS

FIG. 4 is a reduced sectional, partly omitted view of the shift control device of FIG. 1;

FIG. 5 is an elevational view of a position plate employed in the shift control device of FIG. 1;

DESCRIPTION OF THE PREFERRED EMBODIMENT

Figure 12:
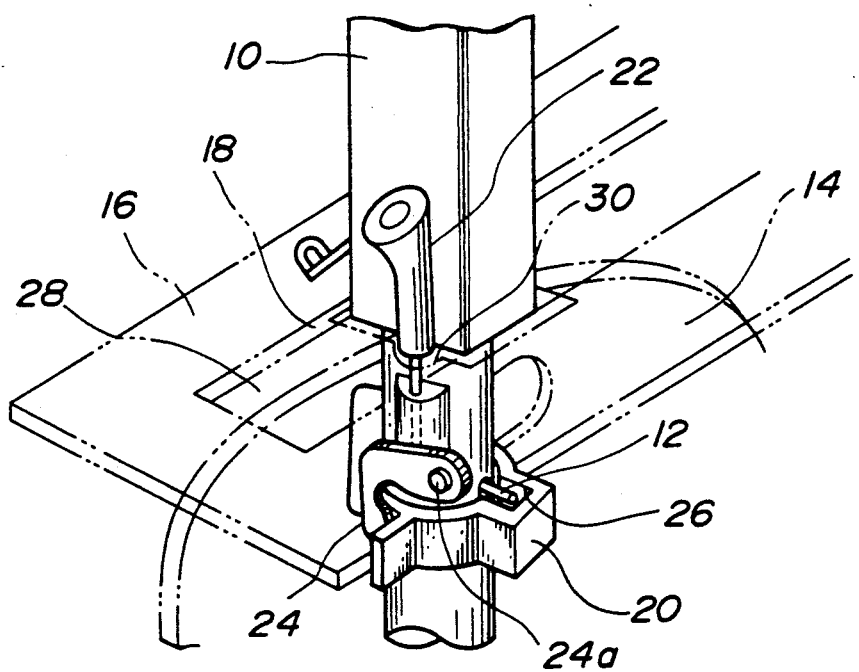
FIG. 12 is a perspective, partly omitted view of a prior art transmission shift control device with a park lock releasing mechanism.

Referring to FIGS. 1 through 7 in which like or corresponding parts to those of the prior art transmission shift control device of FIG. 12 are designated by the same reference numerals, a gear position indicator and top panel assembly 16 is formed with an inwardly flanged opening 32 adjacent to a slot 18. A hollow, generally cylindrical release button 34 is movably installed in the opening 32 and has a closed outer end and an open inner end. The inner end is formed with two pairs of radially resilient but axially rigid legs 34a. Each legs 34a have at free ends thereof radially outwardly projecting fingers 34b for engagement with the inner end of a flange 36 around the opening 32 for thereby preventing the release button 34 from slipping off from the opening 32. A coil spring 38 is disposed between the outer end wall 34e of the release button 34 and a bracket 40 integral with the flange 36 and extending across the opening 32. By this spring 38, the release button 34 is urged upward to cause the fingers 34b to be pressed against the inner end of the flange 36 around the opening 32. In this connection, the release button 34 has a pair of notches 34c between the two pairs of legs 34a, for receiving therein the bracket 40 when the release button 34 is pushed downward and thereby enabling the release button 34 to be moved freely without being obstructed by the bracket 40.

A release lever unit 42 is disposed inside of the gear position indicator and top panel assembly 16 and includes a rod 44 serving as an intermediate member, a support member 46 and a release lever 48.

The rod 44 has an L-like shape when viewed in an elevation and includes a substantially horizontal portion 44a, a vertical portion 44b movably installed in a vertical guide hole 46a formed in the support member 46 and an offset portion 44e between the horizontal portion 44a and the vertical portion 44b. The offset portion 44e is elongated in a vehicle longitudinal direction so that the horizontal portion 44a is offset from the vertical portion 44b in the direction going away from the shift lever 10.

The rod 44 further has at a lower free end of the vertical portion 44b a horizontal bent end 44c engaged in an elongated hole 48a which is formed in an end portion of the release lever 48. In this connection, the horizontal bent end 44c of the rod 44 is movable longitudinally of the elongated hole 48a such that the vertical portion 44b of the rod 44 is smoothly movable in the guide hole 46a of the guide member 46 upon swinging or turning of the release lever 48. Further, the release button 34 has between each pair of legs 34a an abutment wall 34d engageable with the horizontal portion 44a of the rod 44 when the selector lever 10 is placed in a "P" position as shown in FIG. 5.

The release lever 48 is pivotally installed on the support member 46 at an end portion opposite to the above described end portion formed with the elongated hole 48a and by means of a pivot 50 which projects from the support member 46 rearwardly of a vehicle body 11. The release lever 48 thus pivots in a plane transversal to the directions in which the selector lever 10 swings, i.e., in a plane extending in a vehicle width direction. The release lever 48 has at the end portion formed with the elongated hole 48a, a depending arm 48b for engagement with a radial flange 20a of the bushing 20. A torsional spring 52 is placed around the pivot 50 and has an end portion 52a engaged with the horizontal bent end 44c of the rod 44 and the other end portion 52b engaged in a groove 46c formed in the above described support member 46 so as to urge the release lever 48 clockwise in FIG. 2. The support member 46 is secured to the selector lever 10 with a screw 47 inserted into a hole 46b.

The selector lever 10 is swingable into a plurality of gear positions including a "P" position and other gear positions such as "R" position, "N" position, "D" position, "2" position and "1" position as shown in FIG. 5. In this connection, the position plate 14 is formed with a profiled opening 14a having along the upper edge thereof a plurality of detents for locating or holding the selector lever 10 in such gear positions. The position pin 12 is engageable with the detents for holding the selector lever 10 in one of the gear positions selectively.

Figure 1:
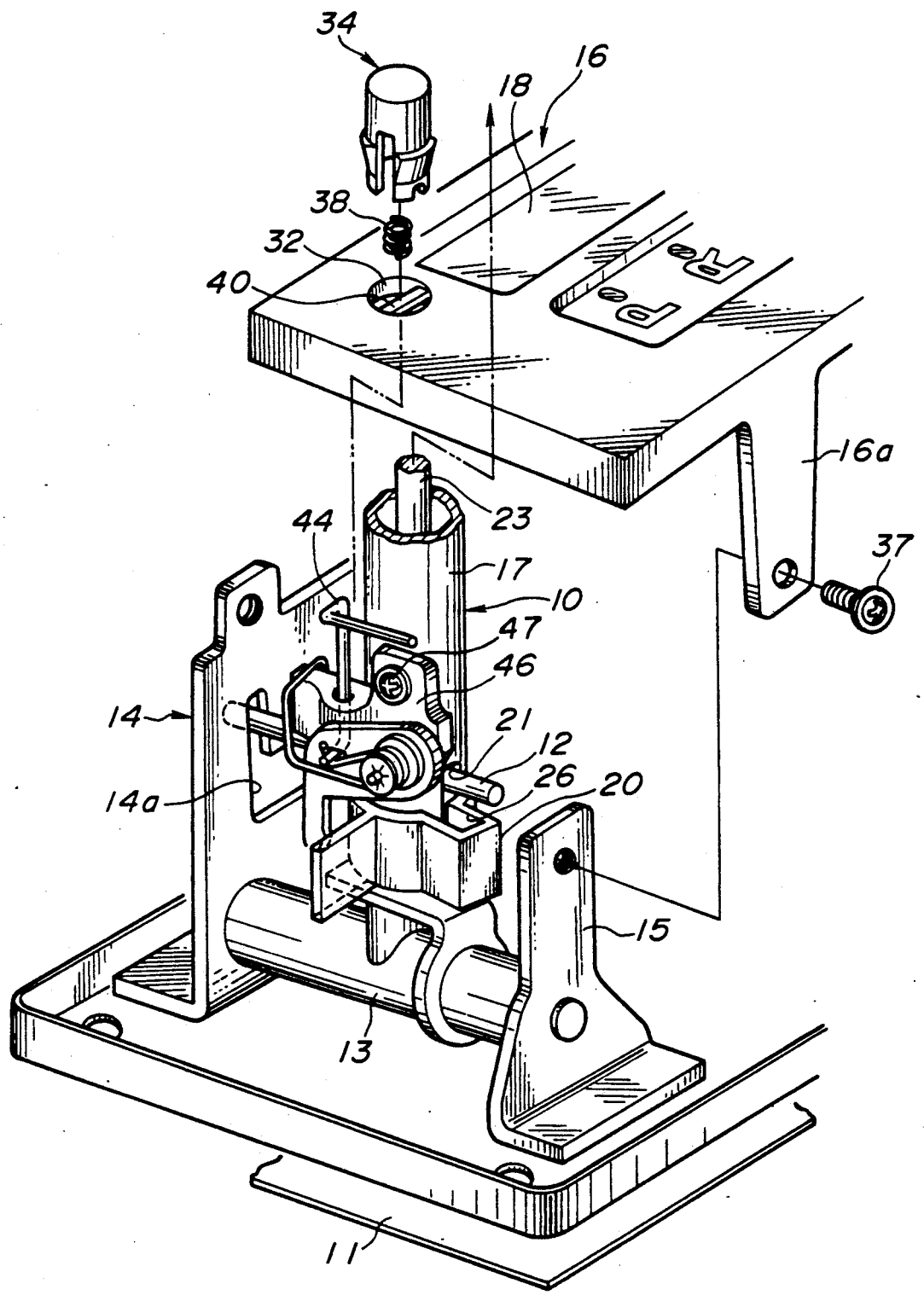
FIG. 1 is a perspective, partly omitted view of a transmission shift control device incorporating a park lock releasing mechanism according to an embodiment of the present invention.
Figure 2:
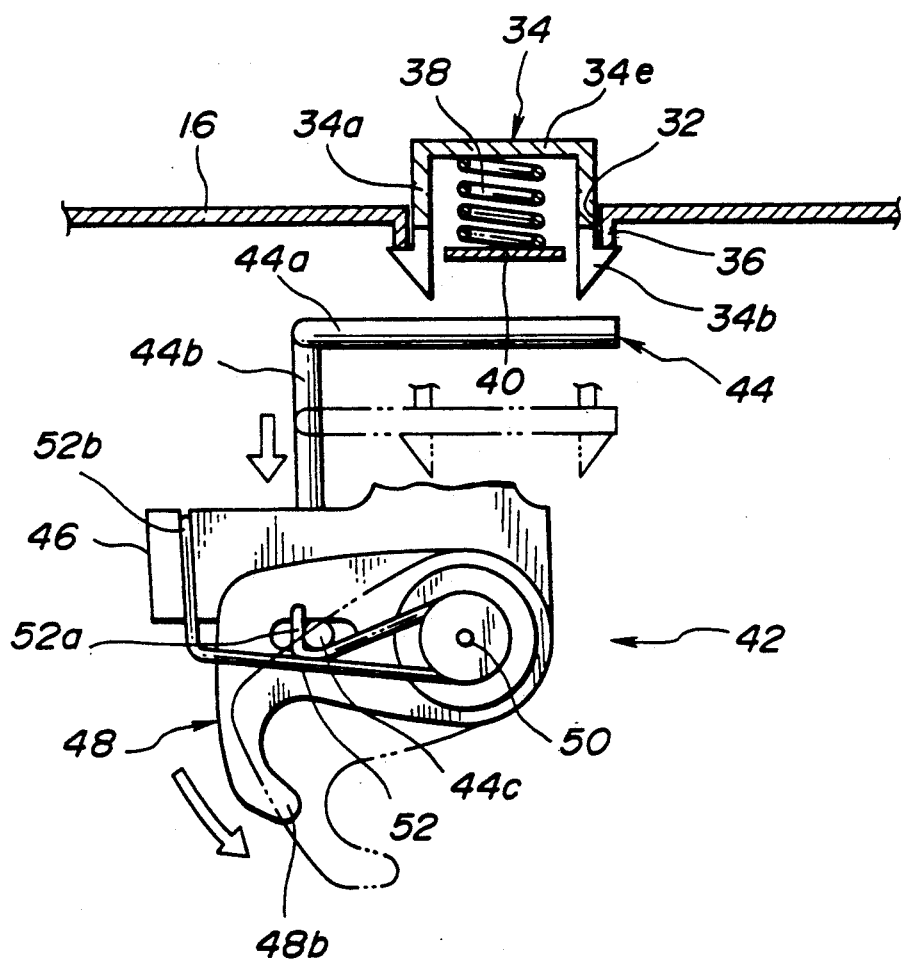
FIG. 2 is an enlarged elevational, partly sectioned view of the park lock releasing mechanism of FIG. 1.
Figure 3:
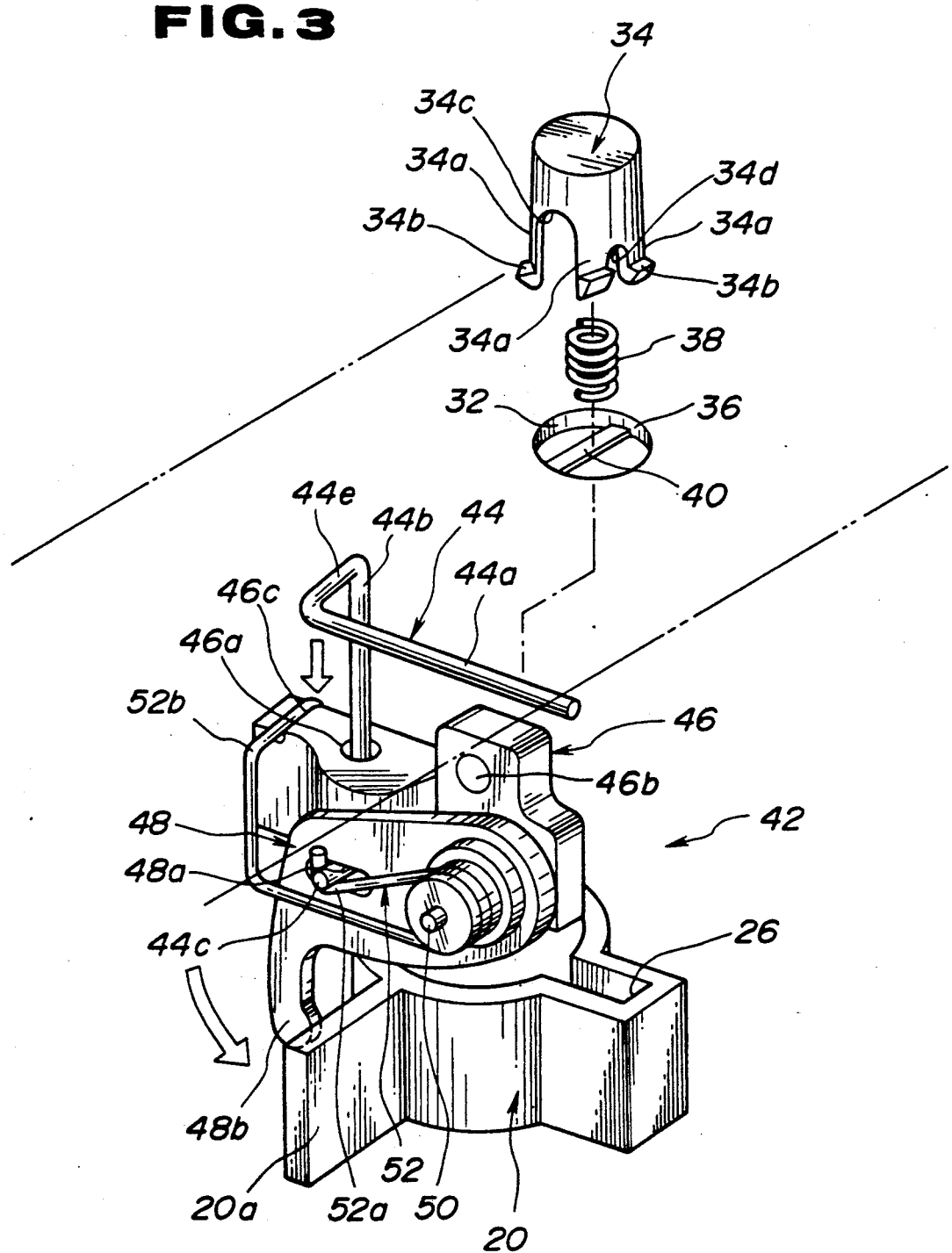
FIG. 3 is an enlarged perspective view of the mechanism of FIG. 1.

The selector lever 10 includes a hollow cylindrical post 17 pivotally mounted on the vehicle body 11 by way of a horizontal pivot shaft 13, vertical bracket 15, etc. as shown in FIG. 1 and a knob 19 attached to the upper end of the post 17. In this connection, also installed on the bracket 15 is the gear position indicator and top panel assembly 16 at its downward legs 16a (though only one is shown) and screws 37. The post 17 is formed with a pair of diametrically opposed openings 21 and 21 for receiving therein the position pin 12. The openings 21 and 21 are elongated axially of the post 17 for allowing up-and-down movement of the position pin 12 relative to the position plate 14. The position pin 12 extends across or transversely of the post 17 and have opposite ends projecting outwardly from the openings 21 and 21. A reciprocative rod 23 is installed in the post 17 for up-and-down movement and attached to the position pin 12 at the lower end by way of a slider 25. A slide cam 27 having a tapered cam face 27a is installed in the knob 19 and attached to the upper end of the rod 23 for up-and-down movement with same. A coil spring 29 is installed in the post 17 for urging the rod 23 and the slide cam 27 upward together with the position pin 12. A control button 31 is installed in the knob 19 for horizontal movement and has an inner end portion 31a engaged with the tapered cam surface 27a so that pushing the control button 31 inward of the knob 19 or allowing the former to project outward of the latter causes downward movement or upward movement of the slide cam 27 and the rod 23.

In order to shift the selector lever 10 from the "P" position to other gear positions as "R", "N", "D", "2" and "1", it is necessary to push the control button 31 into the knob 19 for thereby moving the position pin 12 downward into the lower end portions of the openings 21 and 21 so that the position pin 12 can clear or go over a stopper portion 14b of the profiled opening 14a of the position plate 14.

The bushing 20 is in the form of a generally part-circular band or split ring and concentrically mounted on the post 17 for rotation but against axial movement. The bushing 20 has an opening 33 between opposite circumferential ends 35 and 35 thereof and another opening 26 defined by a channel-shaped circumferential wall portion 39 in such a way as to extend throughout the axial length of the bushing 20 and to diametrically oppose to the opening 33. The bushing 20 further has a radially projecting flange 20a.

The position pin 12 moves up-and-down in the openings 26 and 33 during movement of the selector lever 10 from the "P" position into other gear positions such as the "R (reverse)" position, "N (neutral)" position, "D(drive)" position. "1(first)" position and the "2(second)" position. In other words, in order to shift the selector lever 10 from the "P" position to other gear positions, it is necessary to place the position pin 12 in the lower end portions of the openings 21 and 21. To attain this, it is inevitable that the position pin 12 is moved into the openings 26 and 33.

Figure 6:
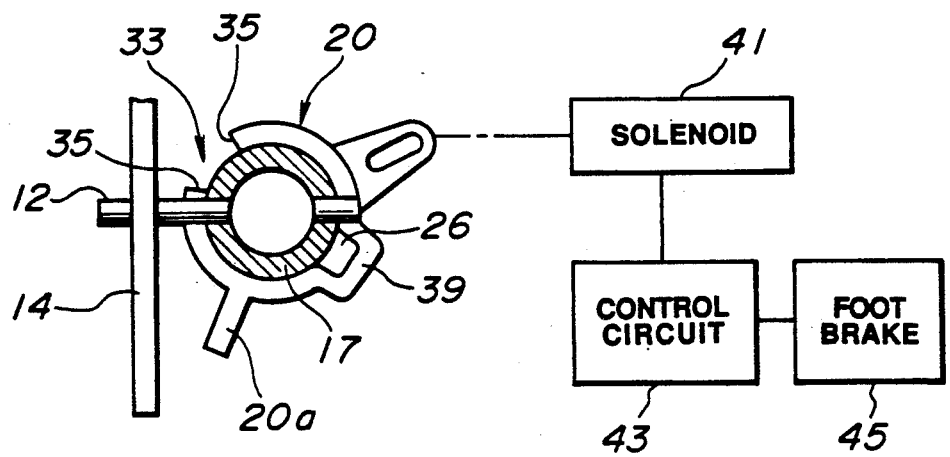
FIG. 6 is a sectional view taken along the line VI—VI of FIG. 4.
Figure 7:
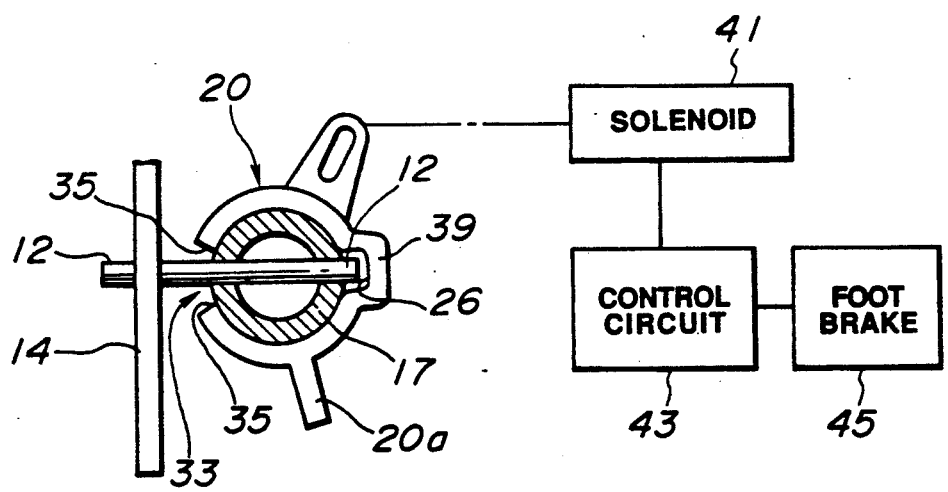
FIG. 7 is a view similar to FIG. 6 showing a bushing in its different operating position.

As shown in FIGS. 6 and 7, a solenoid 41 and control circuit 43 are connected to the bushing 20 for controlling its operating position in such a way that the bushing 20 is rotated into a position shown in FIG. 6, i.e., a position where the openings 26 and 33 are misaligned with the position pin 12, when the position pin 12 is in the "P" position and a foot brake 45 of an associated vehicle is not applied and that the bushing 20 is rotated into a position shown in FIG. 7, i.e., a position where the openings 26 and 33 are aligned with the position pin 12, when the foot brake 45 is applied and even when the position pin 12 is in the "P" position. When the openings 26 and 33 are misaligned with the position pin 12, the downward movement of the position pin 12 in response to the movement of the control button 31 inwardly of the knob 19 is prevented by the bushing 20, i.e., the control button 31 cannot move into the knob 19 sufficiently or a predetermined amount, thus preventing shifting of the selector lever 10 out of the "P" position. Such a control circuit 43 may be structured as disclosed in FIG. 5 of the aforementioned U.S. Pat. No. 4,909,096.

In the foregoing, it is to be noted that the release button 34 and the opening 32 are constructed and arranged so that when the selector lever 10 is in the parking position the horizontal portion 44a of the rod 44 is positioned right under the release button 34 to enable the release button 34 to be abuttingly engageable at the abutment walls 34d with the horizontal portion 44a of the rod 44 when the release button 34 is pushed downward.

With the foregoing structure, when the selector lever 10 is in the "P" position, the rod 44 serving as an intermediate member between the release button 34 and the release lever 48 can be pushed downward against the bias of the spring 52 by pushing the release button 34. Downward movement of the rod 44 which is drivingly connected at the horizontal bent end 44c with the release lever 48, causes the release lever 48 to rotate anticlockwise in FIG. 2. Such movements of the release button 34, rod 44 and the release lever 48 are indicated by the two-dot chain lines in FIG. 2. Rotation of the release lever 48 causes the depending arm 48b thereof to push the flange 20a of the bushing 20 for thereby rotating the bushing 20 into the position shown in FIG. 7. When the push button 31 installed in the knob 19 of the selector lever 10 is pushed under this condition, the position pin 12 is disengaged from the "P" position defining detent of the position plate 14 and movable to engage with other gear position defining detents, i.e., it becomes possible to shift the selector lever 10 from the "P" position to a desired gear position such as "R", "N", "D", "2" and "1".

Figure 8:
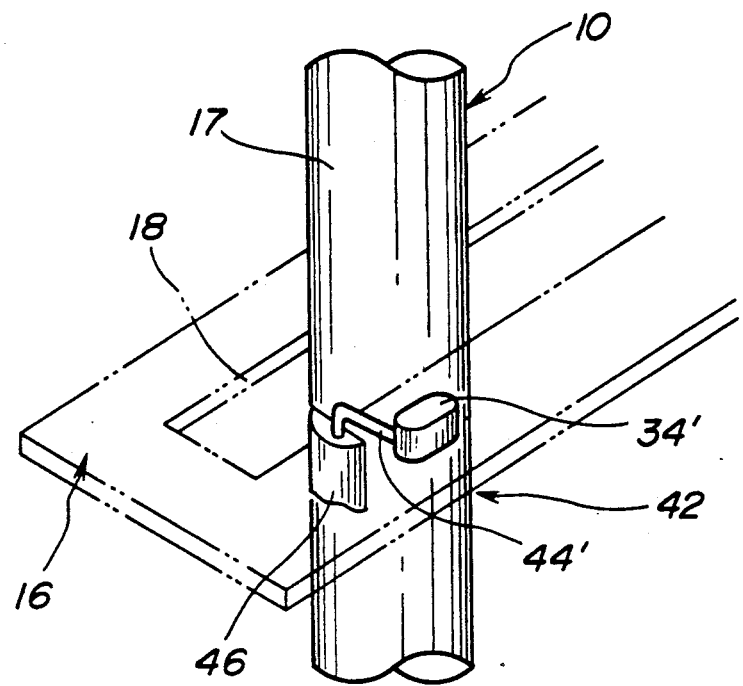
FIG. 8 is a perspective, partly omitted view of a park lock releasing mechanism according to another embodiment of the present invention.
Figure 9:
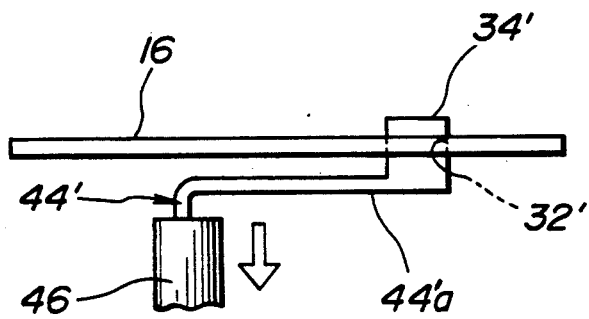
FIG. 9 is an elevational view of the mechanism of FIG. 8.

FIGS. 8 and 9 show another embodiment which differs from the previous embodiment in that the release button 34' is integrally connected to the horizontal portion 44'a of the rod 44'. To this end, the opening 32' is of course shaped to elongate so as to allow movement of the release button 34' together with the selector lever 10. The elongated opening 32' may be closed by a cover member or may not since the elongated opening 32' is not located right above the movable parts as the bushing 20, release lever 48, etc. Such movable parts are protected from direct access of trashes, liquid, etc. This embodiment can be more simple in structure and therefore more economical than the previous embodiment. Except for the above, this embodiment is substantially similar to the previous embodiment and can produce substantially the same effect.

Figure 10:
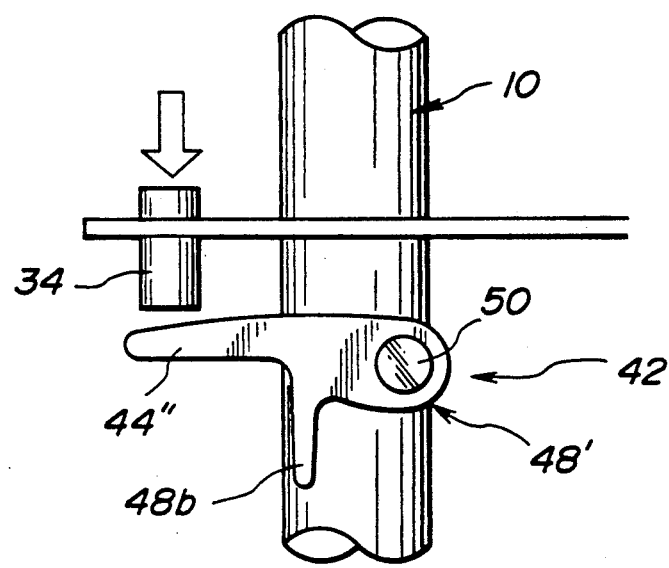
FIG. 10 is a view similar to FIG. 2 showing a park lock releasing mechanism according to a further embodiment of the present invention.
Figure 11:
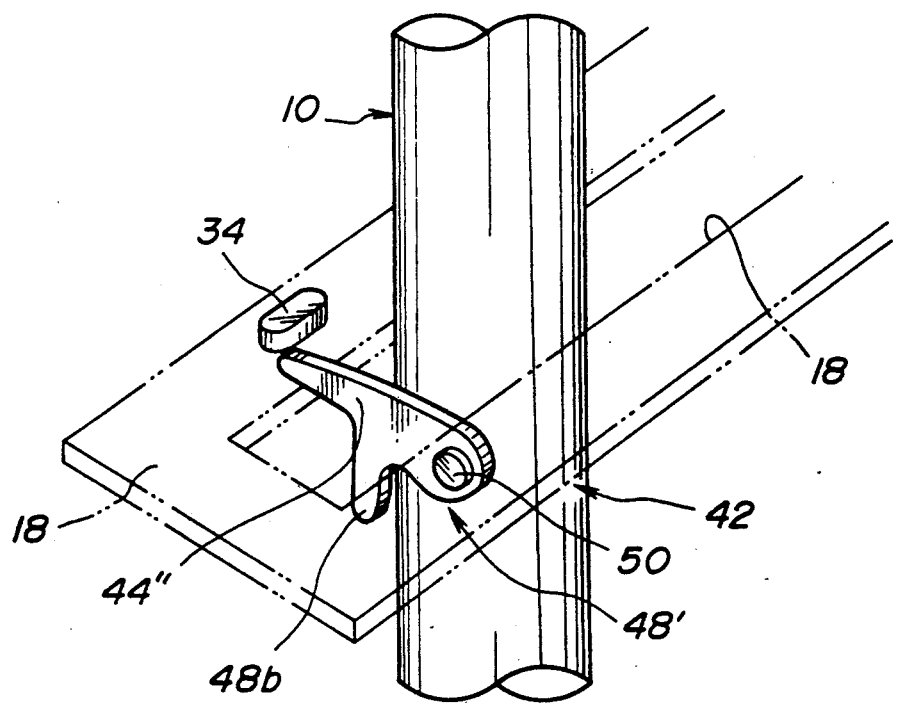
FIG. 11 is a perspective view of the mechanism of FIG. 10.

FIGS. 10 and 11 show a further embodiment which differs from the previous embodiment of FIGS. 1 through 7 in that the release button 34 is disposed on the opposite side of the slot 18 or the selector lever 10 and that the release lever 48' has at the end portion formed with the depending arm 48b, an integral horizontal arm 44" serving as an intermediate member, i.e., the horizontal arm 44" is capable of being positioned right under the release button 34 for engagement with the abutment walls 34d of the release button 34 when the selector lever 10 is in the "P" position. With this arrangement, by pushing the release button 34 it becomes possible to rotate the lever 48' about the pivot 50 in the anticlockwise direction in FIG. 10 for thereby rotating, by way of depending arm 48b and the flange 20a of the bushing 20, the bushing 20 into the position where the position pin 12 is aligned with the openings 26 and 33 of the bushing 20. This embodiment can be more simple in structure and therefore more economical than the previous embodiment of FIGS. 1 through 7. Except for the above, this embodiment is substantially similar to the previous embodiment of FIGS. 1 through 7 and can produce substantially the same effect.

From the foregoing, it will be understood that by the provision of the rod 44, 44' or 44" serving as an intermediate member the release button 34 or 34' can be disposed in a desired place offset from or spaced away from the release lever 48 or 48' in the vehicle width direction, thus making it possible to increase the freedom of design.

It will be further understood that since the release button 34 or 34' can be arranged variously on the gear position indicator and top panel assembly 16 it becomes possible to efficiently utilize the space under the gear position indicator and top panel assembly 16 and further the longitudinal length of the slot 18 can be smaller, thus making it possible to attain a compact transmission shift control device.

What is claimed is:

1. An automatic transmission shift control device for a vehicle, comprising:

a selector lever movable into a plurality of gear positions including a parking position;

a gear position indicator and top panel assembly for indicating a selected one of said gear positions and for concealing the inside of the automatic transmission shift control device from view;

said gear position indicator and top panel assembly being formed with a slot for allowing movement of said selector lever therein;

park lock means disposed inside of said gear position indicator and top panel assembly for preventing shifting of said selector lever out of said parking position position unless a foot brake of a vehicle is applied;

said park lock means having a position plate formed with a plurality of detents defining said gear positions, a position pin movably installed on said selector lever and engageable with said detents for positioning said selector lever at one of said gear positions, and a bushing installed on said selector lever and rotatable between a first position where it permits disengagement of said position pin from a parking position defining detent and a second position where it prevents disengagement of said position pin from said parking position defining detent;

manually operable park lock releasing means generally disposed inside of said gear position indicator and top panel assembly for enabling said selector lever to be shifted out of said parking position without applying a foot brake of the vehicle;

said park lock releasing means having a release button installed on said gear position indicator and top panel assembly for up-and-down movement, an intermediate member, and a release lever pivotally installed on said selector lever adjacent to said bushing and operatively connected through said intermediate member to said release button for driving said bushing into said first position when said release button is pushed downward, said intermediate member being so shaped as to enable said release button to be offset from said release lever in a vehicle width direction.

2. The device as claimed in claim 1, wherein said intermediate member is installed on said selector lever to move together with said release lever but independently of said release button.

3. The device as claimed in claim 2, wherein said intermediate member has an L-like shape and has a horizontal portion for engagement with said release button and a vertical portion having a horizontal bent end engaged with said release lever.

4. The device as claimed in claim 3, wherein said intermediate member further has an offset portion between said horizontal portion and said vertical portion, which offset portion is elongated in a longitudinal direction of the vehicle.

5. The device as claimed in claim 3, wherein said release lever comprises a nearly horizontal elongated opening in which said horizontal bent end of said intermediate member is engaged.

6. The device as claimed in claim 5, wherein said park lock releasing means further comprises a support member installed on said selector lever, said support member having a guide opening receiving therein said vertical portion of said intermediate member.

7. The device as claimed in claim 6, wherein said release lever has one end portion formed with said elongated opening and another end portion pivotally installed on said support member, said release lever further having at said one end portion thereof a depending arm engaged with said bushing.

8. The device as claimed in claim 7, wherein said release button is hollow, generally cylindrical and has a closed end and an open end, said gear position indicator and top panel assembly being formed with an opening for installing therein said release button, said opening of said gear position indicator and top panel assembly being inwardly flanged so that said gear position indicator and top panel assembly has an inward flange around said opening thereof, said release button having at the open end a plurality of legs formed with fingers for engagement with said inward flange of said gear position indicator and top panel assembly.

9. The device as claimed in claim 8, wherein said gear position indicator and top panel assembly has a bracket crossing said flanged opening thereof and integral with said inward flange.

10. The device as claimed in claim 9, wherein said park lock releasing means further comprises first biasing means disposed between said closed outer end of said release button and said bracket of said indicator for urging said fingers of said legs of said release button against an end of said inward flange of said gear position indicator and top panel assembly, and second biasing means installed on said support member for urging sad release lever toward a position for causing said bushing to assume said second position.

11. The device as claimed in claim 10, wherein said release button is integrally connected to said intermediate member.

12. The device as claimed in claim 1, wherein said intermediate member is integrally connected to said release lever and in the form of a horizontal arm extending from an end portion of said release lever, said release lever having at said one end portion a depending arm engaged with said bushing and pivotally installed at the other end portion on said selector lever.

* * * * *